(12) United States Patent
King et al.

(10) Patent No.: US 11,947,043 B2
(45) Date of Patent: Apr. 2, 2024

(54) OPTICAL PHASED ARRAY CONTROLLED RF PHASED ARRAY

(71) Applicant: Rockwell Collins, Inc., Cedar Rapids, IA (US)

(72) Inventors: Oliver S. King, Frederick, MD (US); Ronald D. Esman, Mclean, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 839 days.

(21) Appl. No.: 17/024,873

(22) Filed: Sep. 18, 2020

(65) Prior Publication Data
US 2022/0091238 A1   Mar. 24, 2022

(51) Int. Cl.
| | |
|---|---|
| *G01C 3/08* | (2006.01) |
| *G01S 7/481* | (2006.01) |
| *G02F 1/29* | (2006.01) |
| *G02F 1/295* | (2006.01) |
| *H01Q 3/26* | (2006.01) |
| *H01Q 3/38* | (2006.01) |

(52) U.S. Cl.
CPC ............ *G01S 7/4817* (2013.01); *G02F 1/292* (2013.01); *G02F 1/2955* (2013.01); *H01Q 3/2611* (2013.01); *H01Q 3/385* (2013.01)

(58) Field of Classification Search
CPC ...... G01S 7/4817; G02F 1/292; G02F 1/2955; H01Q 3/2611; H01Q 3/385
See application file for complete search history.

(56) References Cited

U.S. PATENT DOCUMENTS

| | | | |
|---|---|---|---|
| 4,620,193 A | 10/1986 | Heeks | |
| 4,965,603 A | 10/1990 | Hong et al. | |
| 5,051,754 A | 9/1991 | Newberg | |
| 5,220,163 A | 6/1993 | Toughlian et al. | |
| 5,307,073 A | 4/1994 | Riza | |
| 5,333,000 A | 7/1994 | Hietala et al. | |
| 5,365,239 A | 11/1994 | Stilwell | |

(Continued)

FOREIGN PATENT DOCUMENTS

| | | | |
|---|---|---|---|
| EP | 3382797 A4 | 11/2018 | |
| WO | WO 2020101742 A1 * | 5/2020 | ............. H04B 10/00 |

OTHER PUBLICATIONS

Extended Search Report in European Application No. 21197535.4, dated Feb. 11, 2022, 10 pages.

(Continued)

*Primary Examiner* — Mark Hellner
(74) *Attorney, Agent, or Firm* — Suiter Swantz pc llo

(57) ABSTRACT

A system may include an optical phased array, a photodiode array, and a radiofrequency (RF) antenna element array. The optical phased array may be configured to: receive a laser signal from a signal laser; and output an optical beam. Each photodiode may be configured to: receive at least a portion of the optical beam and at least a portion of an optical plane wave beam, wherein the optical plane wave beam is formed based at least on a local oscillator (LO) laser that outputs a laser beam having a different wavelength from the signal laser; and output an electronic signal based on the at least the portion of the optical beam and the at least a portion of the optical plane wave beam. The RF antenna element array may be configured to output an RF beam based on received electronic signals from the photodiode array.

20 Claims, 6 Drawing Sheets

(56) References Cited

U.S. PATENT DOCUMENTS

| | | | |
|---|---|---|---|
| 5,369,410 | A | 11/1994 | Reich |
| 5,677,697 | A * | 10/1997 | Lee .................... G01S 7/282 |
| | | | 342/368 |
| 8,779,977 | B2 | 7/2014 | Zhou |
| 9,595,757 | B2 | 3/2017 | Clair et al. |
| 9,692,512 | B2 | 6/2017 | Griffith et al. |
| 10,224,628 | B2 | 3/2019 | Drummond et al. |
| 10,523,331 | B2 | 12/2019 | Calhoun et al. |
| 10,686,523 | B1 | 6/2020 | Gleason et al. |
| 2019/0157757 | A1* | 5/2019 | Murakowski ...... H01Q 21/0025 |
| 2019/0157758 | A1 | 5/2019 | Shi et al. |
| 2019/0319356 | A1 | 10/2019 | Shi et al. |
| 2019/0372219 | A1 | 12/2019 | Schneider et al. |
| 2021/0296770 | A1* | 9/2021 | Uyeno .................. G01S 13/89 |

OTHER PUBLICATIONS

Fatemi, Rezna et al., "A Nonuniform Sparse 2-D Large-FOV Optical Phased Array with a Low-Power PWM Drive", IEEE Journal of Solid-State Circuits, vol. 54, No. 5, May 2019, 15 pages.
https://www.analogphotonics.com/, Michael Watts, Analog Photonics, Innovation Through Silicon, Optical phase array-based LIDAR, Printed Jul. 27, 2020, 6 pages.
Kim, Taehwan et al., "A Single-Chip Optical Phased Array i a Wafer-Scale Silicon Photonics/CMOS 3-D-Integration Platform", IEEE Journal of Solid-State Circuits, vol. 54, No. 11, Nov. 2019, 14 pages.

* cited by examiner

OPTICAL PHASED ARRAY CONTROLLED RF PHASED ARRAY

BACKGROUND

Currently, the radiofrequency (RF) bandwidth and operating frequency of electrically scanned arrays (ESAs) are limited by beam forming electronics needed to control individual antenna elements. While optically controlled RF phased arrays have been demonstrated, they have not been widely adopted due to difficulties in implementing a large number of antenna channels and co-packaging optics with antenna elements and difficulties with cost.

SUMMARY

In one aspect, embodiments of the inventive concepts disclosed herein are directed to a system. The system may include an optical phased array, a photodiode array of photodiodes, and a radiofrequency (RF) antenna element array of RF antenna elements. The optical phased array may be configured to: receive a laser signal from a signal laser; and output an optical beam having an optical wave front, the optical beam based at least in part on the laser signal. Each photodiode may be configured to: receive at least a portion of the optical beam and at least a portion of an optical plane wave beam, wherein the optical plane wave beam is formed based at least on a local oscillator (LO) laser that outputs a laser beam having a different wavelength from the signal laser, wherein the signal laser and the LO laser are phase locked; and output an electronic signal based on the at least the portion of the optical beam and the at least a portion of the optical plane wave beam. Each RF antenna element may be electrically coupled to one of the photodiodes. The RF antenna element array may be configured to output an RF beam having an RF wave front based on received electronic signals from the photodiode array.

In a further aspect, embodiments of the inventive concepts disclosed herein are directed to a method. The method may include: receiving, by an optical phased array, a laser signal from a signal laser; outputting, by the optical phased array, an optical beam having an optical wave front, the optical beam based at least in part on the laser signal; receiving, by each photodiode of a photodiode array of photodiodes, at least a portion of the optical beam and at least a portion of an optical plane wave beam, wherein the optical plane wave beam is formed based at least on a local oscillator (LO) laser that outputs a laser beam having a different wavelength from the signal laser, wherein the signal laser and the LO laser are phase locked; outputting, by each photodiode of the photodiode array of the photodiodes, an electronic signal based on the at least the portion of the optical beam and the at least the portion of the optical plane wave beam; and outputting, by a radiofrequency (RF) antenna element array of RF antenna elements, an RF beam having an RF wave front based on received electronic signals from the photodiode array, each RF antenna element electrically coupled to one of the photodiodes.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
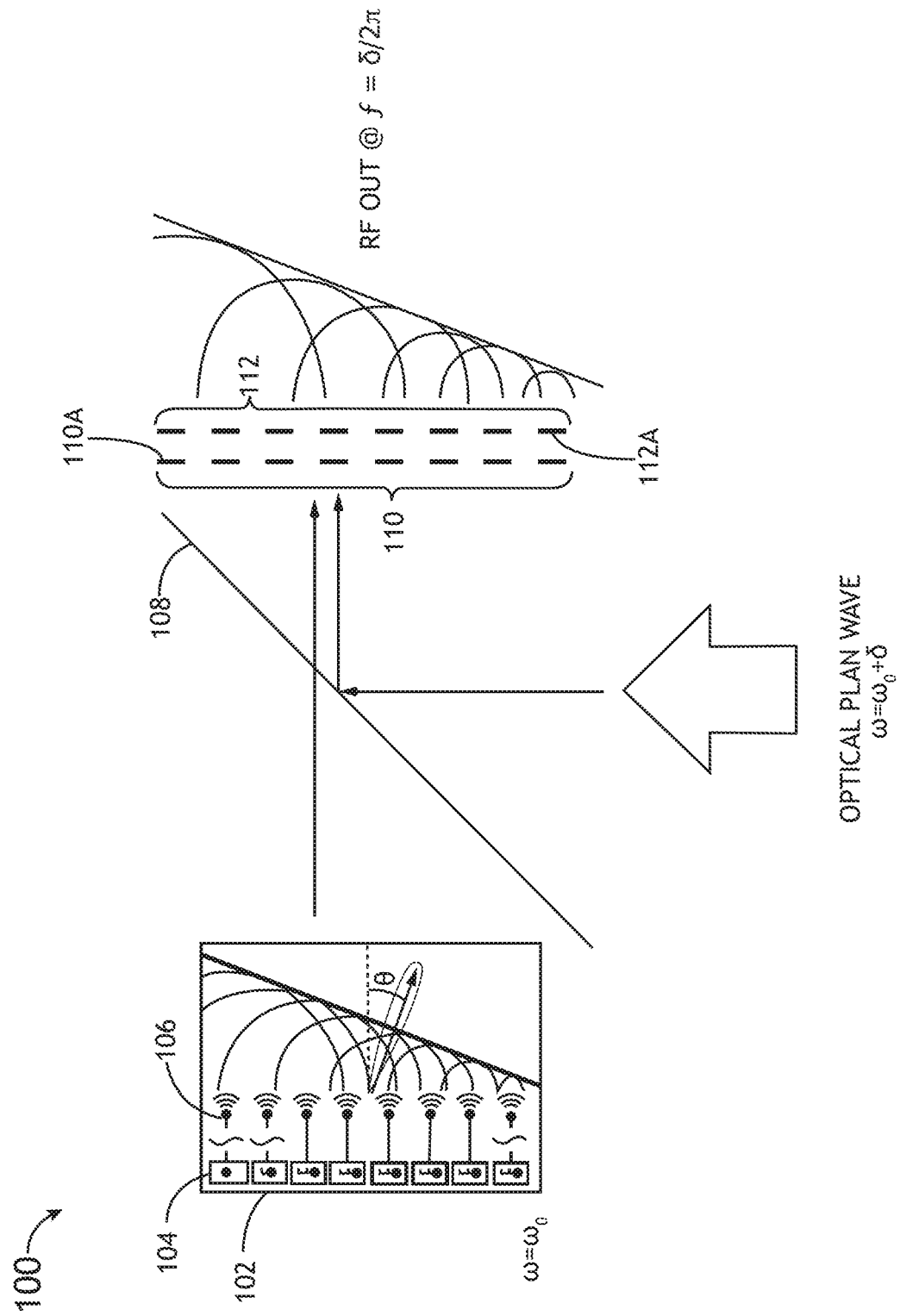
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a method and a system including an optical phased array and a radiofrequency (RF) phased array, wherein the optical phased array may be configured to control the RF phased array.

Some embodiments may include mixing two optical signals in a photodiode (often referred to as a photodetector). Some embodiments may include mixing a laser optical signal from a signal laser with a local oscillator (LO) optical signal from a LO laser. The following equations can be used to describe the mixing of the two optical signals.

$$I \propto [E_{sig} \cos(\omega_{sig} t + \varphi) + E_{LO} \cos(\omega_{LO} t)]^2$$

$$I \propto \tfrac{1}{2} E_{sig}^2 + \tfrac{1}{2} E_{LO}^2 + 2 E_{sig} E_{LO} \cos(\omega_{sig} t + \varphi) \cos(\omega_{LO} t)$$

$$I \propto \tfrac{1}{2} E_{sig}^2 + \tfrac{1}{2} E_{LO}^2 + 2 E_{sig} E_{LO} \quad \cos(\omega_{sig} - \omega_{LO}) + \varphi) + E_{sig} E_{LO} \cos(\omega_{sig} + \omega_{LO}) + \varphi)$$

Where I=detected intensity.

Where $E_{sig}$, $\varphi$=signal electric field amplitude, frequency, phase, respectively.

Where $E_{LO}$, $\omega_{LO}$=local oscillatorelectric field amplitude and frequency, respectively.

For example, mixing of the laser optical signal from the signal laser with the local oscillator (LO) optical signal from the LO laser may produce RF signals with frequencies equal to a sum and difference of the optical frequencies. For example, the difference term may be useful for creating microwave or millimeter-wave RF signals. For example, if the two lasers are phase locked, the phase of the optical signals may be maintained in such a created RF signal. For example, if the two optical signals include an optical signal and a local oscillator (LO) optical signal, the amplitude of the difference term may be proportional to a product of the optical signal and the LO optical signal amplitudes, which may allow for a signal gain.

In some embodiments, optical phased arrays can operate on similar principles as RF phased arrays. For example, the phases of individual optical emitters of an optical phased array may be controlled to form an optical wave front having a desired shape. For example, the phases may be evenly spaced by Δφ (phase change) to form a planar wave front at an angle θ to the emitter plane. For example, Δφ may be equal to 2*Pi*d*sin(theta)/lamda, where: lambda=c/v=2*Pi*c/omega=optical wavelength; c=speed of light; and d=spacing between emitters.

In some embodiments, an output of an optical phased array may be mixed with an optical plane wave in a photodiode array of photodiodes. The optical frequencies of the output of the optical phased array and the optical plane wave may be selected such that a heterodyne signal may be upconverted to RF. The photodetected signal may preserve a phase of the optical phased array. The photodiodes may be connected 1:1 with antenna elements that emit the RF signal. For example, the output of the optical phased array may have a first angular frequency, the optical plane wave may have a second angular frequency equal to the first angular frequency plus delta, and the RF signal may have a frequency equal to delta/(2*Pi).

Some embodiments may provide benefits that reduce size, weight, and power (SWaP). Some embodiments may use optical heterodyning to allow for operation of RF phased arrays with large bandwidth.

Figure 2:
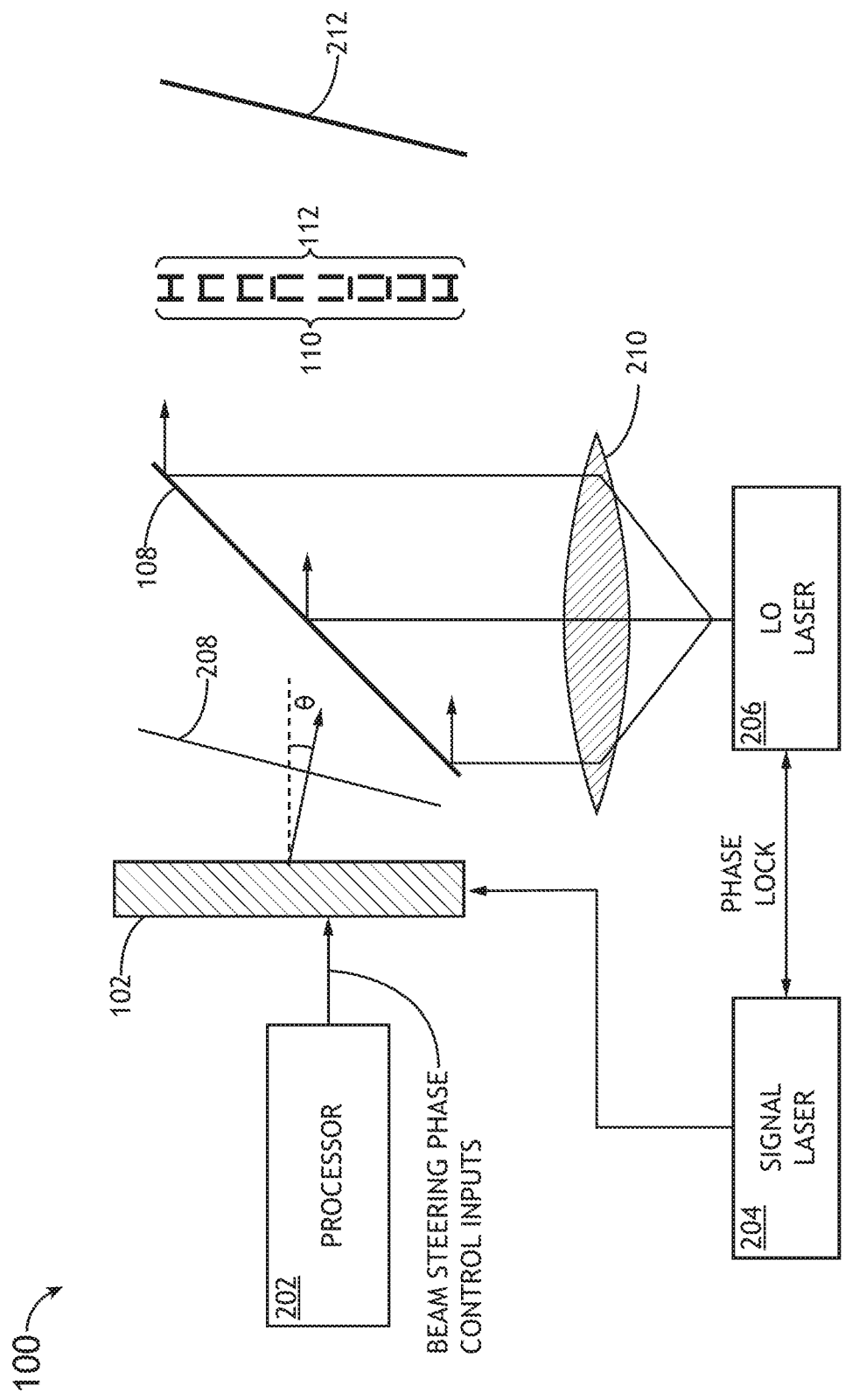
FIG. 2 is a view of an exemplary embodiment of the system of FIG. 1 according to the inventive concepts disclosed herein.

Referring now to FIGS. 1-2, exemplary embodiments of a system 100 are shown.

As shown in FIGS. 1-2, the system 100 may include an optical phased array 102, a beam splitter 108, a photodiode array 110 of photodiodes 110A, an RF antenna element array 112 of RF antenna elements 112A, at least one processor 202, a signal laser 204, an LO laser 206, and/or a collimating lens 210. In some embodiments, one or more elements of the system 100 may be omitted.

The optical phased array 102 may steer an optical beam without needing any mechanical movement. The optical phased array 102 may include phase shifters 104 and an array of optical emitters 106. The steering may occur by controlling the phase shifters 104 to manipulate the relative phase of a number of optical emitters 106. The optical phased array 102 may be configured to receive a laser signal from the signal laser 204. The optical phased array 102 may be configured to output an optical beam having an optical wave front 208, the optical beam based at least in part on the laser signal. The optical beam may be steerable.

The processor 202 may be configured to control the phase shifters 104 of the optical phased array 102 to steer the optical beam of the optical phased array 102. For example, the processor 202 may be configured to control the phase shifters 104 so as to steer the optical beam. In some embodiments, the processor 202 may be configured to cause a steering of the RF beam by controlling the phase shifters 104 of the optical phased array 102. For example, the at least one processor 202 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform if more than one processor) and/or cause (e.g., collectively cause) to be performed any of the operations disclosed throughout. The processor 202 may be configured to run various software applications or computer code stored (e.g., maintained) in a non-transitory computer-readable medium (e.g., memory) and configured to execute various instructions or operations. The processor 202 may be configured to perform any or all of the operations disclosed throughout.

The signal laser 204 may be configured to provide optical power to the optical phased array 102. This power may be spread among optical emitters 106 of the optical phased array 102.

The LO laser 206 may have a different wavelength from the signal laser 204. The wavelength difference may be tuned to provide a desired RF output from the RF antenna element array 112. An optical phase of the LO laser 206 and the signal laser 204 may be phase locked via a phase lock mechanism. The LO laser 206 may be used to produce an optical plane wave beam. The optical plane wave beam may have a fixed phase.

The collimating lens 210 may be positioned at an output of the LO laser 206 (e.g., positioned at an output aperture of the LO laser 206) such that a collimated optical plane wave beam may be formed. For example, the collimating lens 210 may be configured to collimate the optical plane wave beam into a collimated optical plane wave beam prior to reaching the beam splitter 108.

The beam splitter 108 may be coated glass or other material used to spatially overlap the optical beam of the optical phased array 102 and the collimated beam of the LO laser 206. For example, the beam splitter 108 may be configured to spatially overlap the optical beam and the optical plane wave beam.

Each photodiode 110A of the photodiode array 110 may be configured to: receive at least a portion of the optical beam from the optical phased array 102 and at least a portion of the optical plane wave beam, wherein the optical plane wave beam is formed based at least on the LO laser 206 that outputs a laser beam having a different wavelength from the signal laser 204, wherein the signal laser 204 and the LO laser 206 are phase locked; and/or output an electronic signal based on the at least the portion of the optical beam and the at least a portion of the optical plane wave beam. In some embodiments, the optical phased array 102 and the photodiode array 110 may be mechanically coupled to be in proximity to each other.

Each RF antenna element 112A of the RF antenna element array 112 may be electrically coupled to one of the photodiodes 110A. The RF antenna element array 112 may be configured to output an RF beam having an RF wave front 212 based on received electronic signals from the photodiode array 110.

In some embodiments, the optical beam and the optical plane wave beam may be in the invisible spectrum of light (e.g., in the infrared (IR) spectrum (e.g., in the short-wave infrared (SWIR) spectrum)). In some embodiments, the optical beam and the optical plane wave beam may be in the visible spectrum of light.

Figure 3:
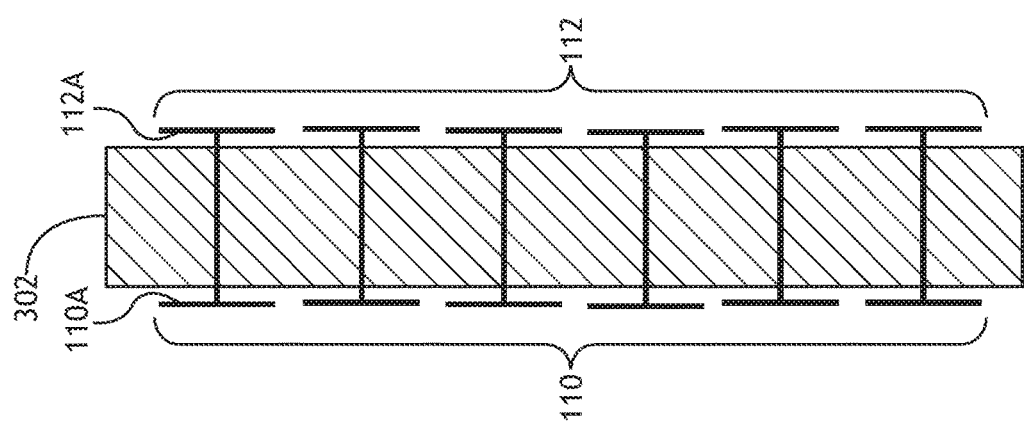
FIG. 3 is a partial view of an exemplary embodiment of the system of FIGS. 1-2 according to the inventive concepts disclosed herein.

Referring now to FIG. 3, an exemplary embodiment of a portion of the system 100 of FIGS. 1-2 is shown. The RF antenna element array 112 may be electrically coupled to the photodiode array 110 with an interconnect 302. For example, the interconnect 302 may include (a) an interposer having vias between each RF antenna element 112A and one of the photodiodes 110A, (b) a direct solder connection between each RF antenna element 112A and one of the photodiodes 110A. For example, the interconnect 302 may be a substrate, wherein the RF antenna element array 112 is fabricated on first side of a substrate, wherein the photodiode array 110 is fabricated on a second side of the substrate.

Figure 4:
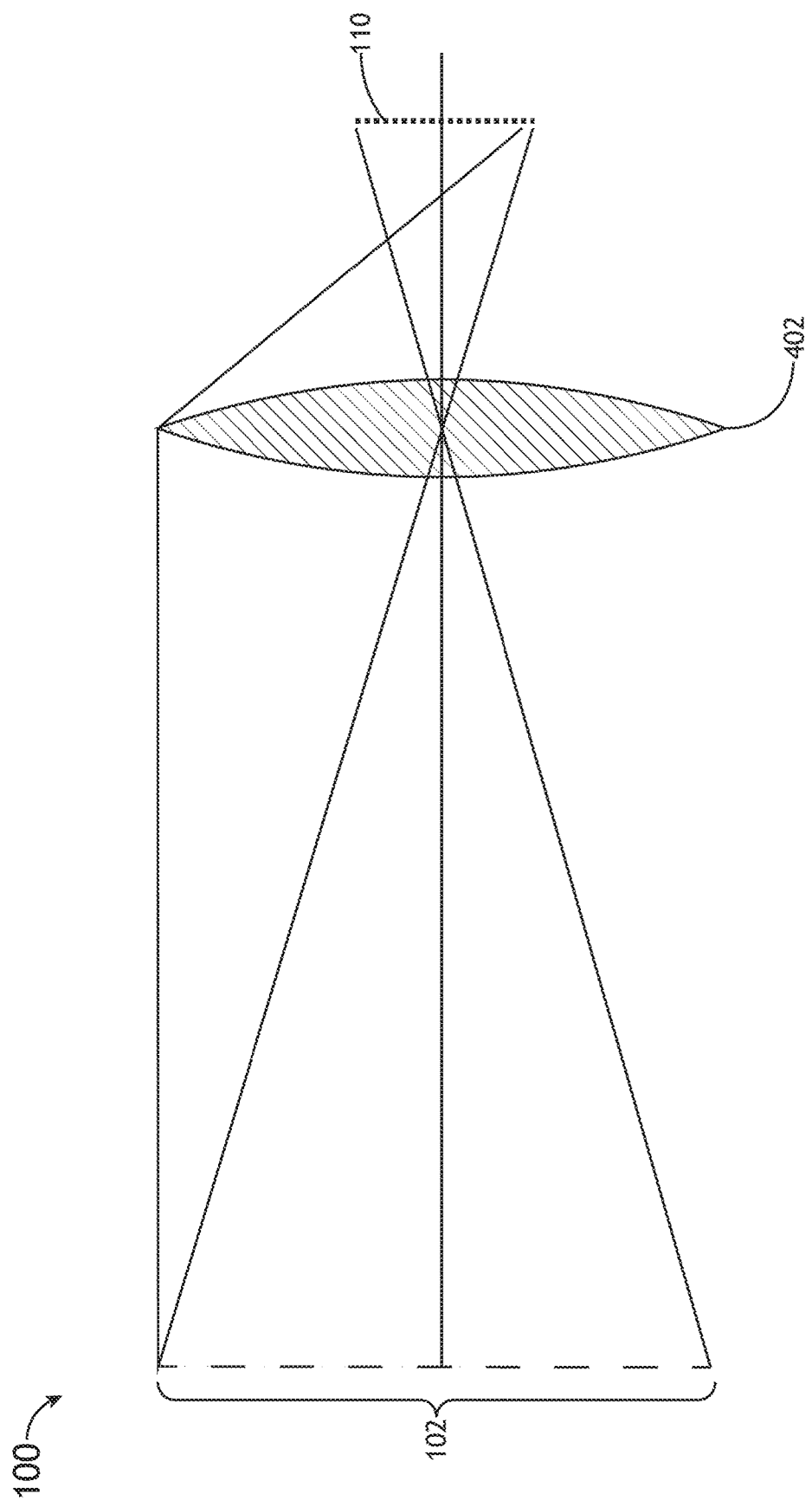
FIG. 4 is a partial view of an exemplary embodiment of the system of FIGS. 1-2 according to the inventive concepts disclosed herein.

Referring now to FIG. 4, an exemplary embodiment of a portion of the system 100 of FIGS. 1-2 is shown. In some embodiments, the system 100 may include a lens 402. The lens 402 may be configured to focus a size of the optical beam and the optical plane wave beam onto the photodiode array 110. In some embodiments, the lens 402 may be configured to match the optical phased array spacing to a differently sized photodiode array 110. In some embodiments, a same optical phased array 102 may be used for RF antenna element arrays 112 designed to operate at different frequencies.

Figure 5:
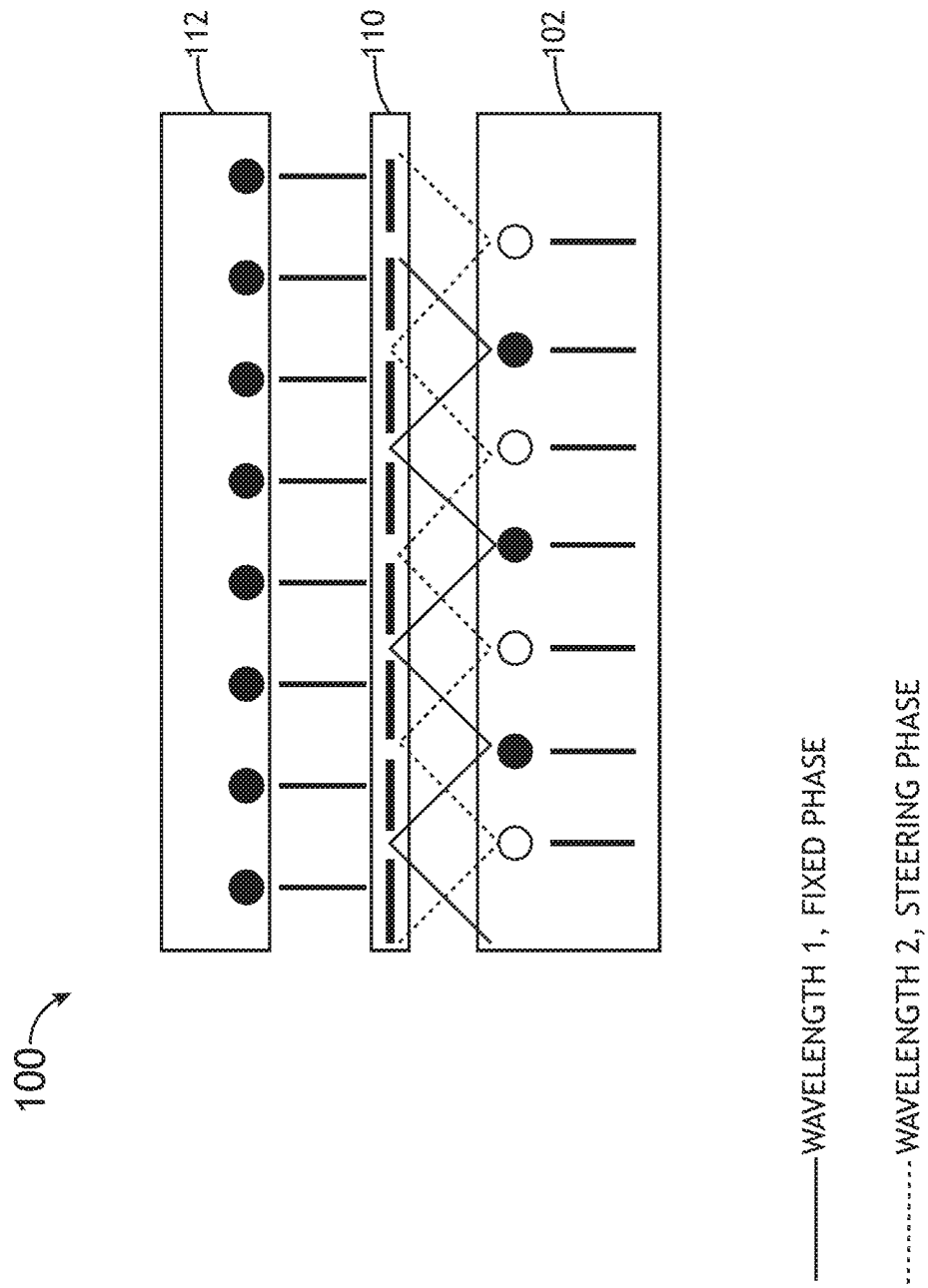
FIG. 5 is a partial view of an exemplary embodiment of the system of FIGS. 1-2 according to the inventive concepts disclosed herein.

Referring now to FIG. 5, an exemplary embodiment of a portion of the system 100 of FIGS. 1-2 is shown. In some embodiments, the laser signal from the signal laser 204 is fed to a first set of the optical emitters 106 configured to output the optical beam, and the laser beam from the LO laser 206 is fed to a second set of the optical emitters configured to output the optical plane wave beam. The first set of the optical emitters 106 and the second set of the optical emitters 106 may be spatially interspersed. The first set of the optical emitters 106 may have output optical signals having a first wavelength with a steerable phase. The second set of the optical emitters 106 may have a second wavelength with a fixed phase. For example, such embodiments may allow for close coupling of the optical phased array 102 and the photodiode array 110.

Figure 6:
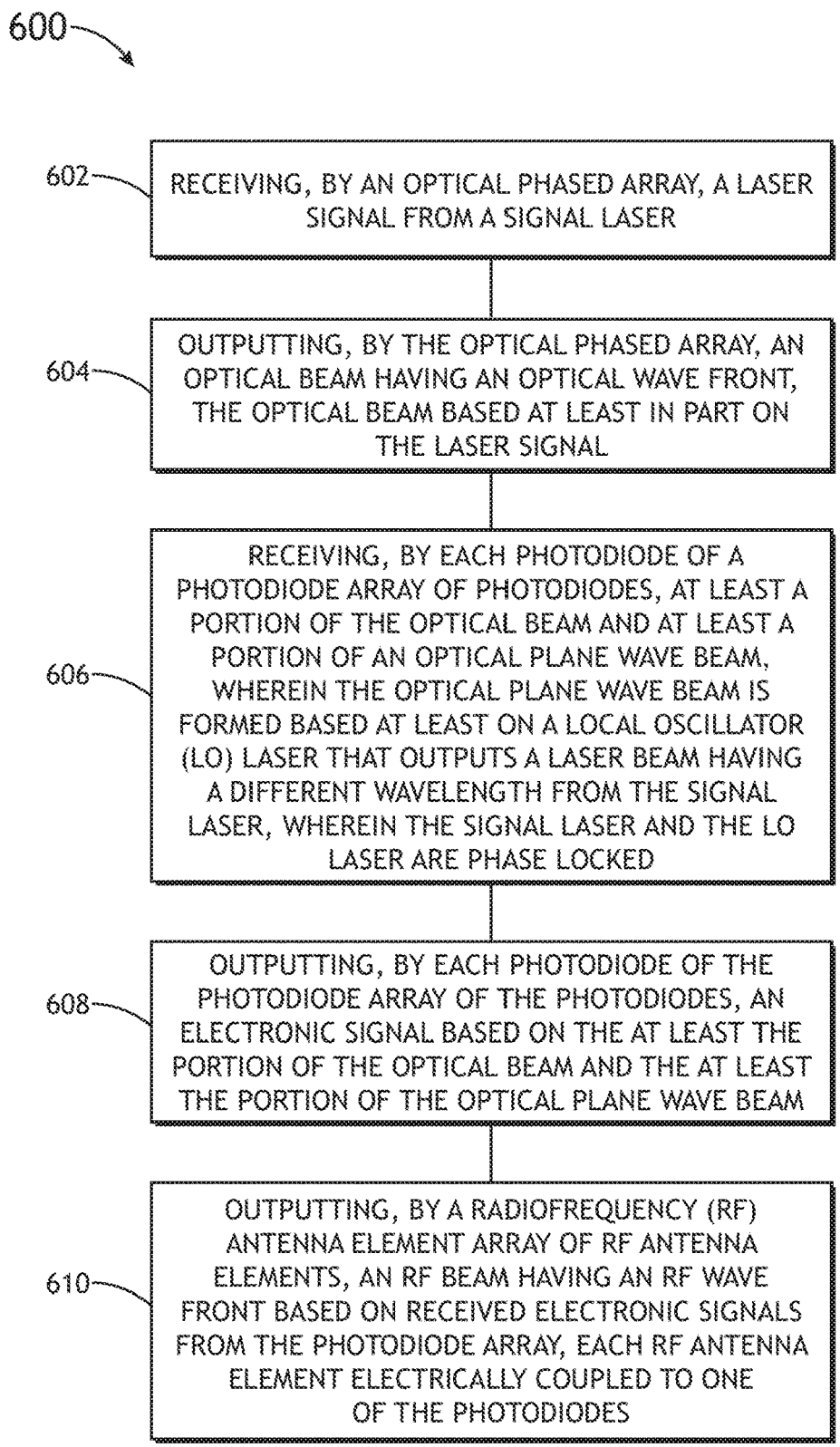
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include receiving, by an optical phased array, a laser signal from a signal laser.

A step 604 may include outputting, by the optical phased array, an optical beam having an optical wave front, the optical beam based at least in part on the laser signal.

A step 606 may include receiving, by each photodiode of a photodiode array of photodiodes, at least a portion of the optical beam and at least a portion of an optical plane wave beam, wherein the optical plane wave beam is formed based at least on a local oscillator (LO) laser that outputs a laser beam having a different wavelength from the signal laser, wherein the signal laser and the LO laser are phase locked.

A step 608 may include outputting, by each photodiode of the photodiode array of the photodiodes, an electronic signal based on the at least the portion of the optical beam and the at least the portion of the optical plane wave beam.

A step 610 may include outputting, by a radiofrequency (RF) antenna element array of RF antenna elements, an RF beam having an RF wave front based on received electronic signals from the photodiode array, each RF antenna element electrically coupled to one of the photodiodes.

Further, the method 600 may include any of the operations disclosed throughout.

As will be appreciated from the above, embodiments of the inventive concepts disclosed herein may be directed to a method and a system including an optical phased array and a radiofrequency (RF) phased array, wherein the optical phased array may be configured to control the RF phased array.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    an optical phased array configured to:
        receive a laser signal from a signal laser; and
        output an optical beam having an optical wave front, the optical beam based at least in part on the laser signal;
    a photodiode array of photodiodes, each photodiode configured to:
        receive at least a portion of the optical beam and at least a portion of an optical plane wave beam, wherein the optical plane wave beam is formed based at least on a local oscillator (LO) laser that outputs a laser beam having a different wavelength from the signal laser, wherein the signal laser and the LO laser are phase locked; and
        output an electronic signal based on the at least the portion of the optical beam and the at least a portion of the optical plane wave beam; and
    a radiofrequency (RF) antenna element array of RF antenna elements, each RF antenna element electrically coupled to one of the photodiodes, wherein the RF antenna element array is configured to output an RF beam having an RF wave front based on received electronic signals from the photodiode array;
    wherein the optical phased array further comprises phase shifters and an array of optical emitters, wherein the system further comprises at least one processor configured to control the phase shifters so as to steer the optical beam;
    wherein the laser signal from the signal laser is fed to a first set of the optical emitters configured to output the optical beam, wherein the laser beam from the LO laser is fed to a second set of the optical emitters configured to output the optical plane wave beam.

2. The system of claim 1, further comprising the LO laser and a beam splitter, wherein the beam splitter is configured to spatially overlap the optical beam and the optical plane wave beam.

3. The system of claim 2, further comprising a collimating lens positioned at an output of the LO laser, wherein the collimating lens is configured to collimate the optical plane wave beam into a collimated optical plane wave beam prior to reaching the beam splitter.

4. The system of claim 1, further comprising a lens configured to focus a size of the optical beam and the optical plane wave beam onto the photodiode array.

5. The system of claim 4, wherein the lens allows the optical phased array and the RF antenna element array to operate at different frequencies.

6. The system of claim 1, wherein the at least one processor configured to cause a steering of the RF beam by controlling the phase shifters of the optical phased array so as to steer the optical beam.

7. The system of claim 1, wherein the first set of the optical emitters and the second set of the optical emitters are spatially interspersed.

8. The system of claim 7, wherein the optical beam is steerable, wherein the optical plane wave beam has a fixed phase.

9. The system of claim 7, wherein the optical phased array and the photodiode array are mechanically coupled to be in proximity to each other.

10. The system of claim 1, wherein the optical beam and the optical plane wave beam are in the short-wave infrared (SWIR) spectrum.

11. The system of claim 1, wherein the RF antenna element array is electrically coupled to the photodiode array (a) with an interposer having vias between each RF antenna element and one of the photodiodes or (b) with a direct solder connection between each RF antenna element and one of the photodiodes.

12. The system of claim 1, wherein the RF antenna element array is electrically coupled to the photodiode array, wherein the RF antenna element array is fabricated on first side of a substrate, wherein the photodiode array is fabricated on a second side of the substrate.

13. A method, comprising:
    receiving, by an optical phased array, a laser signal from a signal laser;
    outputting, by the optical phased array, an optical beam having an optical wave front, the optical beam based at least in part on the laser signal;
    receiving, by each photodiode of a photodiode array of photodiodes, at least a portion of the optical beam and at least a portion of an optical plane wave beam, wherein the optical plane wave beam is formed based at least on a local oscillator (LO) laser that outputs a laser beam having a different wavelength from the signal laser, wherein the signal laser and the LO laser are phase locked;

outputting, by each photodiode of the photodiode array of the photodiodes, an electronic signal based on the at least the portion of the optical beam and the at least the portion of the optical plane wave beam; and outputting, by a radiofrequency (RF) antenna element array of RF antenna elements, an RF beam having an RF wave front based on received electronic signals from the photodiode array, each RF antenna element electrically coupled to one of the photodiodes;

wherein the optical phased array further comprises phase shifters and an array of optical emitters, wherein the system further comprises at least one processor configured to control the phase shifters so as to steer the optical beam;

wherein the laser signal from the signal laser is fed to a first set of the optical emitters configured to output the optical beam, wherein the laser beam from the LO laser is fed to a second set of the optical emitters configured to output the optical plane wave beam.

14. A system, comprising:

an optical phased array configured to:
  receive a laser signal from a signal laser; and
  output an optical beam having an optical wave front, the optical beam based at least in part on the laser signal;

a photodiode array of photodiodes, each photodiode configured to:
  receive at least a portion of the optical beam and at least a portion of an optical plane wave beam, wherein the optical plane wave beam is formed based at least on a local oscillator (LO) laser that outputs a laser beam having a different wavelength from the signal laser, wherein the signal laser and the LO laser are phase locked; and
  output an electronic signal based on the at least the portion of the optical beam and the at least a portion of the optical plane wave beam; and a radiofrequency (RF) antenna element array of RF antenna elements, each RF antenna element electrically coupled to one of the photodiodes, wherein the RF antenna element array is configured to output an RF beam having an RF wave front based on received electronic signals from the photodiode array;

wherein the RF antenna element array is electrically coupled to the photodiode array, wherein the RF antenna element array is fabricated on first side of a substrate, wherein the photodiode array is fabricated on a second side of the substrate.

15. The system of claim 14, wherein the optical phased array further comprises phase shifters and an array of optical emitters, wherein the system further comprises at least one processor configured to control the phase shifters so as to steer the optical beam.

16. The system of claim 14, wherein the RF antenna element array is electrically coupled to the photodiode array (a) with an interposer having vias between each RF antenna element and one of the photodiodes or (b) with a direct solder connection between each RF antenna element and one of the photodiodes.

17. The system of claim 14, further comprising the LO laser and a beam splitter, wherein the beam splitter is configured to spatially overlap the optical beam and the optical plane wave beam.

18. The system of claim 17, further comprising a collimating lens positioned at an output of the LO laser, wherein the collimating lens is configured to collimate the optical plane wave beam into a collimated optical plane wave beam prior to reaching the beam splitter.

19. The system of claim 14, further comprising a lens configured to focus a size of the optical beam and the optical plane wave beam onto the photodiode array.

20. The system of claim 19, wherein the lens allows the optical phased array and the RF antenna element array to operate at different frequencies.

* * * * *